United States Patent [19]

Lundquist

[11] Patent Number: 5,143,307
[45] Date of Patent: Sep. 1, 1992

[54] SECONDARY CUTTER APPARATUS FOR PLASTIC SIZE REDUCTION EQUIPMENT

[76] Inventor: Lynn C. Lundquist, 10833 NE. Russell, Portland, Oreg. 97220

[21] Appl. No.: 667,677

[22] Filed: Mar. 11, 1991

[51] Int. Cl.⁵ ............................................. B02C 18/08
[52] U.S. Cl. ........................................ 241/60; 241/158; 241/225
[58] Field of Search ................ 241/60, 222, 225, 158, 241/236, 152 A, 152 R; 83/500–503, 508

[56] References Cited

U.S. PATENT DOCUMENTS

| | | | |
|---|---|---|---|
| Re. 1,648 | 3/1864 | Mumma | 241/158 |
| 1,826,891 | 10/1931 | Krogan | 241/225 |
| 3,019,829 | 2/1962 | Yoerger | 241/158 X |
| 3,060,778 | 10/1962 | Karber | 241/222 X |
| 3,799,020 | 3/1974 | Hoelmer | 241/222 X |
| 3,874,605 | 4/1975 | Fleming | 241/222 X |
| 4,161,296 | 7/1979 | Parker et al. | 241/222 X |
| 4,355,765 | 10/1982 | Parker et al. | 241/158 X |
| 4,377,261 | 3/1983 | Dumaine et al. | 241/222 |
| 4,615,490 | 10/1986 | Goldhammer | 241/222 X |
| 4,669,673 | 6/1987 | Lodovico et al. | 241/99 |
| 4,687,144 | 8/1987 | Irwin et al. | 241/236 X |
| 4,750,678 | 6/1988 | Lodovico et al. | 241/29 |
| 4,923,126 | 5/1990 | Lodovico et al. | 241/222 X |

*Primary Examiner*—Mark Rosenbaum
*Assistant Examiner*—Frances Chin

[57] ABSTRACT

This invention pertains to the cutter area of size reduction equipment for plastic or other waste material. The primary objective of this invention is to provide a feed mechanism and secondary cutting section to an existing shredder technology. Inasmuch as a properly designed shredder mechanism will produce a uniform material width, a feed mechanism was developed to maintain the orientation of the shreds as they exit from the shredder, and to meter them into a secondary cutter system at a predetermined rate of speed. Said secondary cutter system is so designed that the subsequent cutting action is at a plane perpendicular to the first cutting action. By maintaining said orientation of the shreds, and by controlling the rate of in-feed to the secondary cutter, a uniform chip is produced with a predetermined width and length dimension.

17 Claims, 3 Drawing Sheets

SECONDARY CUTTER APPARATUS FOR PLASTIC SIZE REDUCTION EQUIPMENT

BACKGROUND

1. Field of the Invention

This invention provides an improved cutter design for size reduction equipment as used in plastic or other waste material recovery systems. A first objective of the invention is to provide a cutter arrangement which provides predetermined, uniform granulate size for subsequent processing equipment. Other objectives will be shown in the following description.

Size reduction equipment has recently been developed for plastic and related industries which offers significant advantages over the prior art. An example of this size reduction equipment is Model BC-30 manufactured by Allegheny Recycling and Waste Reduction Equipment, Inc. of Delmont, Pa. (The aforementioned equipment is based on teh patents of Lodovico et al, U.S. Pat. Nos. 4,669,673, and 4,750,678, which have been assigned to John W. Wagner of the Allegheny Recycling company.) This equipment enhances reprocessing production by providing uniform granulate size among that portion of the granulate which has been properly formed. However, an inherent disadvantage of this equipment is the inadvertent production of a mix of properly formed granulate with improperly formed shreds.

The present invention is a further refinement within the secondary cutter area of this newer equipment which eliminates shred formation. The result is a granulate with a predetermined, uniform size.

2. Description of the Prior Art

For the purposes of definition as used in describing the end product of the plastic size reduction process, the term "granulate" will mean any finished product after final processing, irrespective of size. The term "fine" will mean a granulate which is substantially less in dimension than that which is desired. The term "shred" will indicate a finished material which is properly sized in one dimension when viewed in a two dimension plane, but is of excessive length in the other. And finally, the term "chip" will mean a two dimensioned granulate which is formed with a prescribed dimension in both its length and width.

It should be obvious to the trained observer that the processing horsepower requirements of this technology are in direct relationship to the size reduction of the granulate. That is, each cut of the individual granulate requires power input until said granulate is discharged from the screen area of the equipment. When size reduction takes place beyond optimum size requirements, such as when fines are produced, the horsepower requirements of the equipment are increased without a corresponding increase in material throughput or quality. In practice, it has been shown that the horsepower requirements for processing a given weight of material is considerably less when all size reduction to the material is accomplished during a single pass through any portion of the equipment, as against multiple passes through the same equipment when the granulate size is allowed to exhibit a random distribution of size.

Thus, it can unequivocally be stated that size reduction equipment which processes the granulate in a single pass greatly reduces the power requirements for the process. Consequently, the equipment supplied by Allegheny Recycling and Waste Reduction Equipment, Inc. achieves a greatly enhanced throughput rate for a given horsepower as compared with recirculating bed knife systems.

However, effective as the Allegheny system is in reducing the power requirements of the process, it has the shortcoming of producing properly sized chips in combination with shreds. This is an acceptable approach if size reduction of waste is the sole objective. (Though it must be pointed out that material reduced to chips will occupy considerably less volume than the same material reduced to shreds.) However, when reprocessing of the granulate is the objective (such as is the case in plastic recovery systems) the presence of shreds becomes a major obstacle.

Lodovico et al, in attempting to correct this shortcoming, has patented a system which uses both a primary and a secondary cutting section. This approach reduces the horsepower requirements for processing a given weight of waste material. Nonetheless, there are certain shortcomings in this system which this invention seeks to remedy.

This invention comprises an improvement in the Allegheny two-stage cutter design (which henceforth will be referred to as Lodovico et al.). The first stage of this present invention is the subject of a prior patent application entitled CUTTER ENHANCEMENT FOR PLASTIC SIZE REDUCTION EQUIPMENT, Ser. No. 07/595,258. The second stage of this invention is an improvement over the prior art found in the Lodovico two-stage design, as stated in the first claim of U.S. Pat. No. 4,669,673.

The technology of this invention differs from that of Lodovico et al. in the following ways:

1. A larger diameter secondary cutting rotor is used resulting in a better cutting action of the shred.
2. An open secondary cutting rotor is used which allows better chip dispersal and reduces undesirable additional cutting action.
3. Deflector plates are used which guide the material into the secondary cutting area.
4. A feed roller system is used which controls the rate of shred cutting by the secondary cutting rotor.
5. The center line of the secondary cutter is substantially located on an imaginary line between the outlet portion of the primary cutters and the bed knife. Further, the imaginary line is essentially the plane of discharge of the shredded material.
6. A negative pressure material blower is advantageously added at the discharge area of the secondary cutting section resulting in better material feed through the primary and feed sections of the machine. Said material blower further reduces turbulence in the secondary cutting section reducing undesirable chip cutting.
7. The primary cutting section is structurally separate from the feed section. This allows ready removal of the primary cutting section for maintenance.

Thus, I am suggesting that the invention I am offering is both novel as compared with the prior art and will offer the end user significant utilitarian advantages.

OBJECTIVES OF THE INVENTION

This invention was developed with an understanding of the limitations of the previously described size reduction equipment. Furthermore, it was designed with a number of other objectives considering its potential application.

1. It is the general objective of this invention to provide a size reduction machine for waste material (most generally plastic) which will produce a uniform chip size with a single pass through said machine.
2. Another objective of the invention is to provide a cutting action which reduces the required horsepower for a given quantity of through-put.
3. Another objective of the invention is to provide a means of regulating the feed rate to the secondary cutting section which is both positive and yet simple.
4. A final objective of the invention is to provide a complete unit which is both robust and simple, yet which allows ease of removal of the primary cutter assembly.

These and other objectives and advantages of the present invention, and the manner in which they are achieved, will become apparent in the following specifications and claims.

SUMMARY OF THE INVENTION

In its basic concept, the present invention is a material size reduction system which employs three separate sections to accomplish the task of reducing waste material (primarily plastic) to uniform chips. In the first section, counter-rotating shafts, having parallel axis of rotation, with mutually meshing cutters mounted thereon, reduce said waste material to shreds of a uniform width.

In the feed section, the shreds are griped between feed rollers which maintain their orientation from the primary cutting section and feed said shreds to the secondary cutting section at a constant and predetermined rate of speed in relationship to the rotating cutter knives.

In the secondary cutting, and final, section of the machine, the oriented shreds are cut to a uniform length which results in a chip with a predetermined width and length dimension. A negative pressure evacuation system is generally employed to improve the efficiency of material feed and removal from the machine.

DESCRIPTION OF THE PREFERRED EMBODIMENTS

Figure 1:
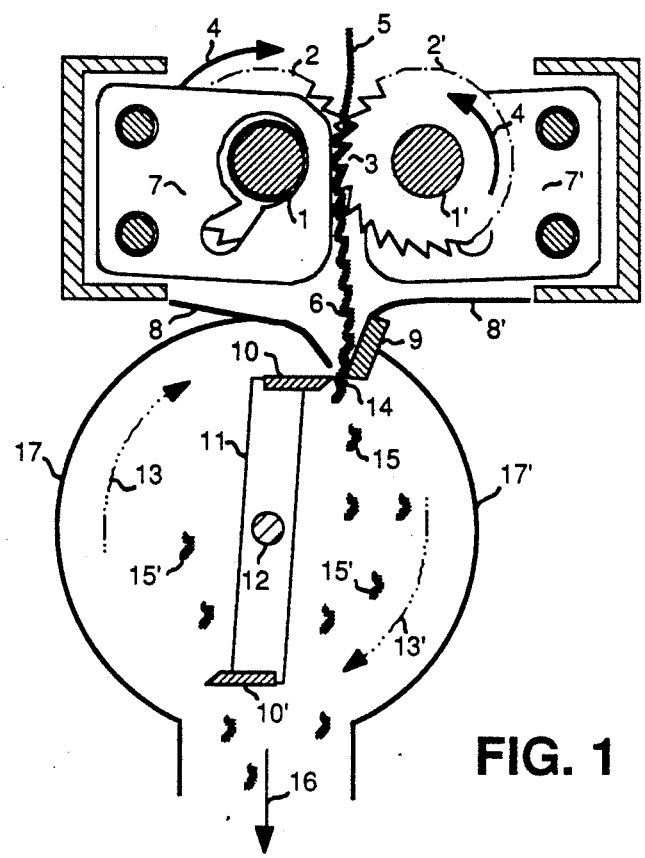
FIG. 1 is an end view of the primary cutting section on top and the secondary cutting section on the bottom.

To simplify the description, symmetrical parts, or portions of a single part where divided by a sectional view, will be designated with a prime ('). The description of the part(s) having primed reference characters will be limited to a minimum.

Referring now to FIG. 1, a cutter head assembly is shown which is the subject of U.S. patent application Ser. No. 07/595,258 entitled CUTTER ENHANCEMENT FOR PLASTIC SIZE REDUCTION EQUIPMENT. In the application just referred to, two parallel, counter-rotating shafts 1 and 1' are so located that alternating primary cutters 2 and 2' are mounted thereon. The spacing between the centers of the shafts is such that the cutters overlap by approximately eighty degrees of arc at 3. In the preferred embodiment, the shafts 1 and 1' are so oriented that the shaft centers are in a plane parallel to the floor from any point between the shaft pair, or points along a single shaft from end to end.

In the preferred embodiment, the shafts rotate toward each other as viewed from the top, and as indicated by arrows 4 and 4'. Thus, material 5 fed to the cutters is drawn through the cutter assembly from the top and exits as a shred 6 from the bottom.

It should be noted that the embodiment of this invention is shown with a separator plate 7 in the cutter head. This separator plate differs substantially from the pinch plate described in the aforementioned patent application, and thus a shred 6 is generated rather than a finished chip.

Deflector plates 8 are used to guide the shreds across the bed knife 9 and into the arc of the rotating cutter knives 10. The open cutter knife frame 11 (wherein the entire assembly is designated as the rotor) revolves about a central shaft 12 mounting point in the direction indicated by arrows 13. As the shred is cut between the bed knife 9 and the cutter knives 10 at 14, the shred 6 is cut into individual chip portions 15.

Movement of the shred 6 into the bed knife cutting area 14 and through the secondary cutter knife 10 section is enhanced in the preferred embodiment by a material evacuation blower 37 (FIG. 6) which creates a negative pressure at 16. Inasmuch as the secondary cutter housing 17 is totally enclosed and opens to atmosphere only at its discharge 16 and at the in-feed portion at 14, the draft created through the cutter head draws the material 5 through the proper feed area across the bed knife 9.

Figure 2:
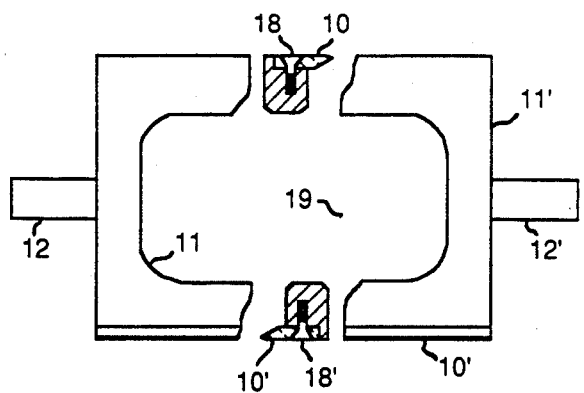
FIG. 2 is a side view of the secondary cutter open rotor with a partial sectional view of the inset knives.

FIG. 2 illustrates the rotor assembly which is comprised of the knife frame 11 with its two rotor shafts 12 and mounted cutter knives 10. The cutter knives 10 are secured to the knife frame 11 with fasteners at 18. It should be noted that in the preferred embodiment of the secondary cutter section, the rotor is designed with an open section at 19. This open section aids chip flow by eliminating the physical interference which would result with a solid rotor and by reducing windage.

Figure 3:
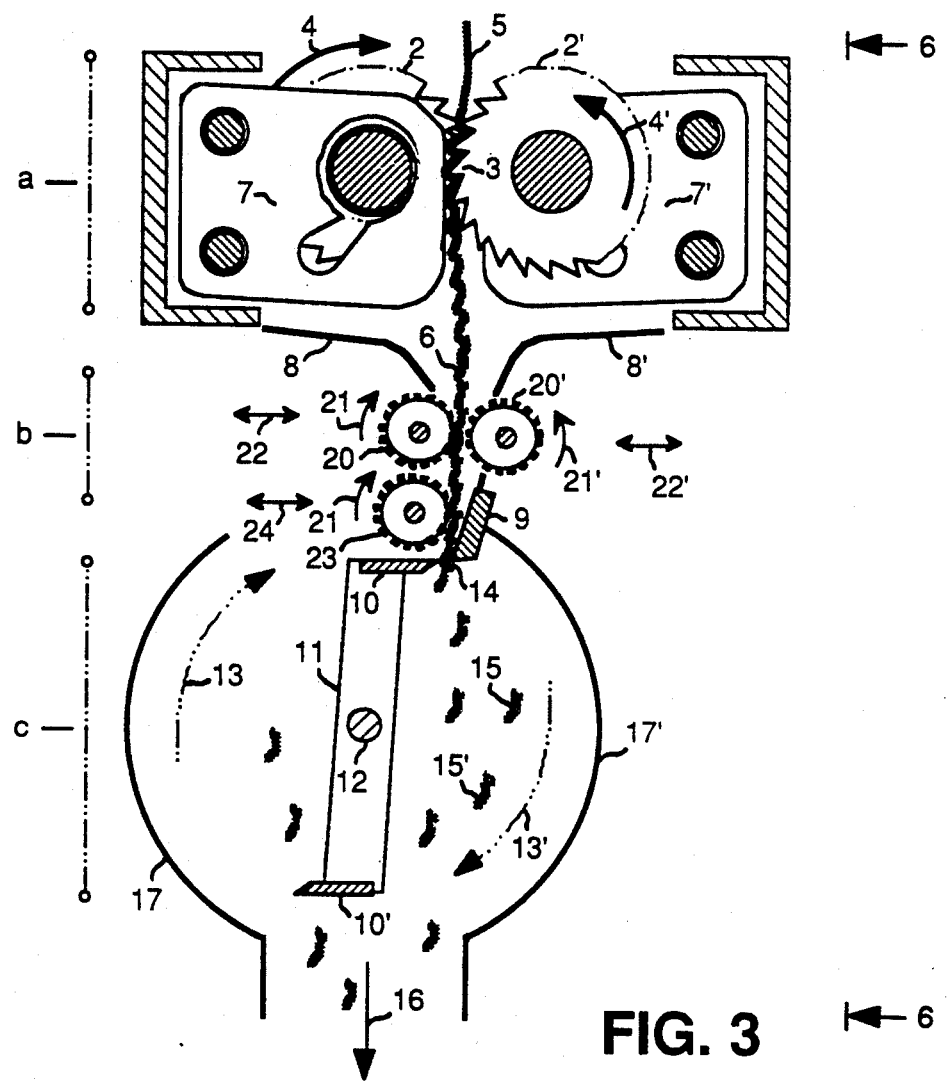
FIG. 3 is an end view of the preferred embodiment showing the primary cutting section on top, feed rollers in an intermediate position, and the secondary cutting section on the bottom.

FIG. 3 is the preferred embodiment of the completed assembly. In this view, the three sections of the operational machine are shown. That is, the primary cutting (or shredding) section a, the feed section b, and the secondary cutting (or granulating) section c.

Inasmuch as the intent of this invention is to provide a uniform chip size, it is important that the shred 6 be fed to the cutter knives 10 at a uniform and controlled rate. This is accomplished by feeding the shred 6 into a first set of top rollers 20 which grip the material and control its feed rate. The top segmented feed rollers 20 rotate as indicated by the direction arrows 21. Said rollers further have a freedom of movement indicated by arrows 22 which are spring loaded so that the material is held in compression between the two top feed rollers 20.

A lower segmented feed roller 23 is used to control the feed rate as close to the cutting area 14 as possible.

The lower feed roller 23 also has freedom of movement as indicated by arrow 24 so that the shred 6 feed rate is controlled by the action of the rotating rotor pressing the material against the bed knife 9.

Again, as in the previous explanation of FIG. 1, a material evacuation blower 37 (FIG. 6) is used to provide a negative pressure at 16. Inasmuch as the entire secondary cutter section housing 17, defector plate 8 area, and the section comprising the segmented feed rollers 20 and 23 (not shown) is enclosed, the negative pressure 16 from the material evacuation blower 37 is sustained throughout the entire feed path of the material 5 and shred 6. As in the previous case, this enhances the feed rate and clears the chips from the secondary cutter area.

Figure 4:
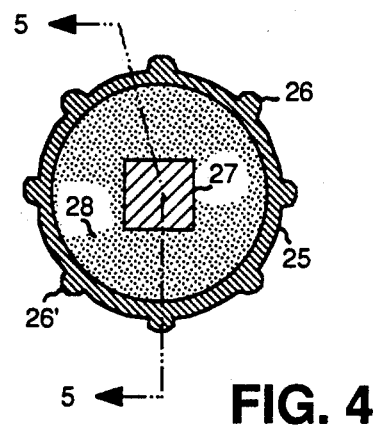
FIG. 4 is a section view of an elastomeric filled segmented feed roller.
Figure 5:
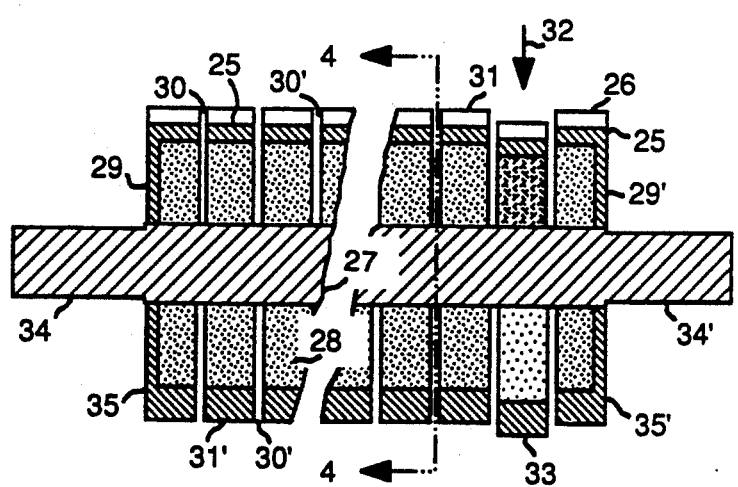
FIG. 5 is a partial side view of an elastomeric filled segmented feed roller.

FIG. 4 illustrates a view of an elastomeric filled segmented feed roller 20 or 23 along line 4—4 of FIG. 5. Said segmented feed roller consists of an external, hollow metal casing 25 with integrally formed cogs 26. The cogs 26 provide a gripping surface by which the shreds 6 are more easily drawn through the cutter section. A square section shaft 27 is cast into an elastomer (in most cases, a polyurethane) shock member 28 which transmits power from the shaft 27 to the metal casing 25 portion of the segmented feed roller 20 or 23.

Figure 6:
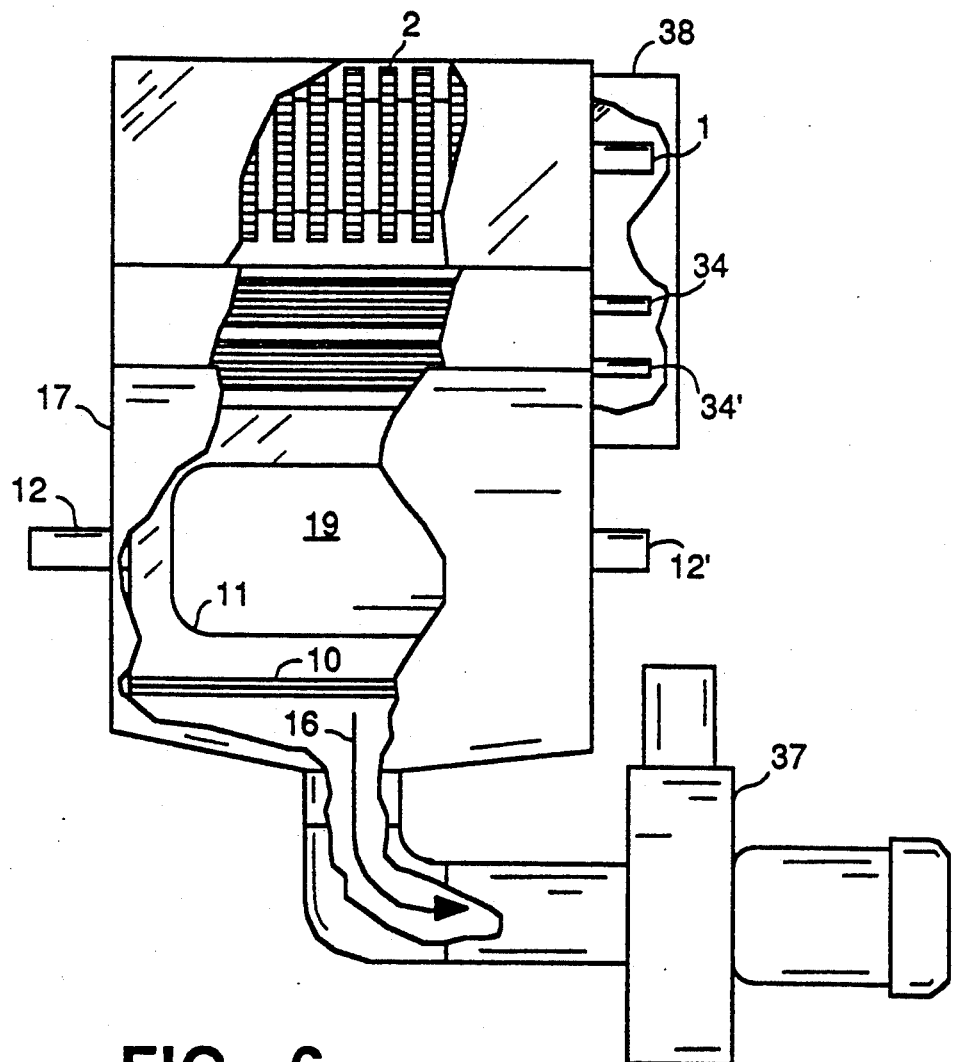
FIG. 6 is a side view, with a partial cut-away section, of the mechanism taken along line 6—6 of FIG. 3.

FIG. 5 illustrates the view of the segmented feed roller 20 or 23 along line 5—5 of FIG. 4. The segmented feed roller 20 or 23 is manufactured by locating an appropriately formed metal casing 25 with formed cogs 26 over a square shaft 27. Further, the metal casing 25 is completely capped on at least one end 29. An elastomeric casting compound (generally polyurethane) is poured into the casing 25 which, when cured, forms the elastomeric shock member 28. Subsequent to the curing of said elastomeric casting compound, a narrow kerf 30 is radially cut through the metal casing 25 and said elastomeric compound thus forming a number of independently mounted feed roller segments 31. The segmented feed roller 20 or 23 is thus capable of two independent motions which assure a gripping action against the shreds 6 passing through them. The first action is that allowed by the spring controlled force as indicated by arrows 22 or 24 in FIG. 3. The second motion is that of the individual feed roller segments 31 which are able to deflect under a given thickness of shred 6 as indicated by arrow 32 and shown in roller segment position 33. The square roller shaft 26 has round bearing and drive ends 34. FIG. 6 depicts a side view of the mechanism, depicting a drive housing 38, which encloses the drive portion of the apparatus, which drives the shafts in the primary cutting section and the feed section, and shows the material evacuation blower 37.

OPERATION

In the preferred embodiment, as illustrated in FIG. 3, multiple sheets of waste material 5 (most specifically plastic) are fed into the primary cutters 2 from above. The material 5 is griped by the counter-rotating primary cutters 2 and is drawn into the cutting area 3 where it is sheared between the faces of any two opposing cutters 2 and 2'.

The material, in the form of a shred 6, subsequently passes through the primary cutter head area, and is engaged by the counter-rotating top feed rollers 20. The spring action (shown at 22) and the segmented portions (as indicated by 31) of said feed rollers individually grip the shred 6 so that said shred can be fed into the secondary cutting chamber at a predetermined rate. In order to prevent longer shreds from disengaging from the top segmented feed rollers 20, a supplementary lower segmented feed roller 23 is used to provide a continuous metered feed to the rotating cutter knives 10. The lower feed roller 23 compresses the shred 6 against the bed knife 9.

The segmented feed rollers 20 and 23 are constructed with an end segment 35 which is rigidly mounted to the shaft 26 by means of the end caps 29. Further, the kerf 30 between any of the independently mounted feed roller segments 31 is kept as thin as practicably possible in manufacture. In this way, the intermediate feed roller segments 31 will be kept in alignment on the shaft in spite of heavy side or deflecting loads.

Certain speed ratios should be maintained between the primary cutting (shredding) a, feeding b, and secondary cutting c portions of the equipment to maintain optimum operation. It is preferable to have the segmented feed rollers 20 and 23, operating at slightly above the feed rate of the primary cutters 2 to prevent an accumulation of material in the discharge area of the primary cutters. A feed roller (20 and 23) speed of some five percent-of-surfacespeed greater than that of the primary cutters' a through-put speed is optimum. The secondary cutter c should be run at such a speed that the final chip length is between 1 (one) and 1.5 (one and one-half) times the width of said shred.

It is also advantageous to maintain a proper dimension between the cutting portions of the rotating cutter knives 10. The cutting edges of said knives should be a minimum of ten inches apart when measured through the open section 19 of the cutter knife frame 11. That is, the knife edges should be at a ten inch diameter or greater. This allows a flatter approach angle between the cutter knives 10 and the bed knife 9, which in turn allows the shred 6 to pass over the bed knife 9 at the most uniform rate.

Vertical alignment of the various elements of the system are also important. If an imaginary line is drawn through the system in a plane as the shred 6 would travel, it should pass between the top feed rollers 20, between the lower feed roller 23 and the bed knife 9, and exit at an optimum plane at the location where the shred is cut 14. The location of the rotor shaft 12 is such that the rotating cutter knives 10 and the bed knife 9 penetrate the shred 6 at this optimum angle when the shred 6 exits the feed section at 14.

Providing a negative pressure 16 at the material discharge area is advantageous for optimal operation. Because the material path through each of the successive three sections of the machine are closed to atmosphere, the draft through the material path helps regulate the material movement and keeps chips from being cut multiple times by the rotating cutter knives 10.

In another embodiment, as illustrated in FIG. 1, the feed section may be eliminated. In this case, the shred 6 is fed directly from the primary cutter section a to the secondary cutter section c. Deflector plates 8 are the sole mechanical means of directing the material across the bed knife 9 into the cutting area 14. The air flow through the system which is provided by the negative pressure at 16 is important to optimum operation.

While the present invention has been disclosed with respect to a preferred embodiment and modification thereto, further modifications will be apparent to those of ordinary skill in the art within the scope of the claims that follow. It is not intended that the invention be limited by the disclosure, but instead that its scope be determined by reference to the claims which follow herein below.

The embodiments of the invention in which an exclusive property or privilege is claimed are defined below.

What I claim is:

1. An improved material handling and cutting mechanism comprising: a primary rotating cutter assembly, having opposing counter-rotating cutters with mutually meshing cutter discs, and cutting means arranged about the periphery of the cutter discs which perform a primary cutting action which forms shreds of a predefined shape of the material being cut:

a secondary cutting section including a rotating cutting blade having an open rotor frame with opposed, spaced apart cutter knives carried thereon, which cooperates with a bed knife thereby forming a cutting point, for cutting shreds into chips of uniform size; and a deflector to direct the shreds from the primary cutting section to said secondary cutting section, said deflector being constructed and arranged to maintain the shreds in the same orientation as in the primary cutting section, said deflector including a pair of spaced apart deflector plates which define a discharge point from the primary cutting section;

wherein said secondary cutting section is located such that shred exiting said discharge point of the primary cutting section is delivered in a substantially straight line to said cutting point.

2. The material handling and cutting mechanism of claim 1 further including feeding means interposed between the primary cutting section and said secondary cutting section, comprising a set of feed rollers, each carried on a driven shaft, working in unison, which deliver the shreds into said secondary cutting section at a predetermined rate in relationship to the cutting action of said second cutting section rotating cutting blade, wherein uniform chip lengths are produced by the action of said second cutting section rotating blade.

3. The material handling and cutting mechanism of claim 2 which includes a mounting for the primary cutting section which permits ready removal of the primary cutting section from the remainder of the cutting mechanism.

4. The material handling and cutting mechanism of claim 2 wherein said secondary cutting section has a discharge portion and which further includes a negative pressure blower located at the discharge portion of said secondary cutting section which provides a negative air pressure throughout the cutter thereby facilitating a desirable progression and orientation of the shred and chips through the cutter.

5. The material handling and cutting mechanism of claim 2 wherein one of said feed rollers is mounted adjacent to said bed knife for compressing a shred against said bed knife.

6. The material handling and cutting mechanism of claim 2 wherein said feed rollers are segmented, and include a resilient core fixed to its associated shaft so that the segmented sections of said roller may engage shredded material passing therethrough with a constant pressure independent of the thickness of shredded material passing through adjacent segmented sections.

7. The material handling and cutting mechanism of claim 2 wherein said driven shafts of said feed section are driven at a predetermined speed in relation to the speed of said rotating cutting blade, thereby to produce a chip length which is from one to one and one-half times the width of the chip.

8. The material handling and cutting mechanism of claim 1 wherein said rotating cutting blade is constructed and arranged with a diameter such that the cutting action of said cutter knives displaces said shreds in the direction of travel across the bed knife.

9. The material handling and cutting mechanism of claim 1 which includes a mounting for the primary cutting section which permits ready removal of the primary cutting section from the remainder of the cutting mechanism.

10. The material handling and cutting mechanism of claim 1 wherein said secondary cutting section has a discharge portion and which further includes a negative pressure blower located at the discharge portion of said secondary cutting section which provides a negative air pressure throughout the cutter thereby facilitating a desirable progression and orientation of the shred and chips through the cutting mechanism.

11. A material handling and cutting mechanism comprising: a primary cutting section having a rotating cutter assembly, with opposing counter-rotating cutters with mutually meshing cutter discs, and cutting means arranged about the periphery of the cutter discs which perform a primary cutting action which forms shreds, having a predetermined width thereto, of the material being cut;

a mounting for the primary cutting section;

feeding means including plural feed rollers, each carried on a driven shaft, a secondary cutting section including a rotating cutting blade having an open rotor frame with opposed, spaced apart cutter knives carried thereon, which cooperates with a bed knife thereby forming a cutting point, for cutting shreds into chips of uniform size; and a deflector to direct the shreds from the primary cutting section to said feeding section, said deflector being constructed and arranged to maintain the shreds in the same orientation as in the primary cutting section, said deflector including a pair of spaced apart deflector plates which define a discharge point from the primary cutting section;

wherein said secondary cutting section is located such that shreds exiting said discharge point of the primary cutting section are delivered in a substantially straight line to said cutting point.

12. The material handling and cutting mechanism of claim 11 wherein said feeding means is constructed and arranged to deliver the shreds into said secondary cutting section at a predetermined rate in relationship to the cutting action of said second cutting section rotating cutting blade, wherein uniform chip lengths are produced by the action of said second cutting section rotating blade.

13. The material handling and cutting mechanism of claim 11 wherein said feed rollers are segmented, and include a resilient core fixed to its associated shaft so that the segmented sections of said roller may engage shredded material passing therethrough with a constant pressure independent of the thickness of shredded material passing through adjacent segmented sections.

14. The material handling and cutting mechanism of claim 11 wherein said driven shafts of said feeding means are driven at a predetermined speed in relation to the speed of said rotating cutting blade, thereby to produce a chip length which is from one to one and one-half times the width of the chip.

15. The material handling and cutting mechanism of claim 11 wherein said rotating cutting blade is constructed and arranged with a diameter such that the cutting action of said cutter knives displaces said shreds in the direction of travel across the bed knife.

16. The material handling and cutting mechanism of claim 11 wherein said mounting for the primary cutting section is constructed and arranged to permits removal of the primary cutting section from the remainder of the cutting mechanism.

17. The material handling and cutting mechanism of claim 11 wherein said secondary cutting section has a discharge portion and which further includes a negative pressure blower located at the discharge portion of said secondary cutting section which provides a negative air pressure throughout the cutter thereby facilitating a desirable progression and orientation of the shred and chips through the cutter.

* * * * *